United States Patent [19]

Putt et al.

[11] Patent Number: 4,878,647
[45] Date of Patent: Nov. 7, 1989

[54] PNEUMATIC IMPULSE VALVE AND SEPARATION SYSTEM

[75] Inventors: James C. Putt; Robert N. Hohenshil, both of Doylestown, Ohio

[73] Assignee: The B. F. Goodrich Company, Akron, Ohio

[21] Appl. No.: 240,030

[22] Filed: Sep. 2, 1988

[51] Int. Cl.4 .......................... F16K 31/40; B64D 5/16
[52] U.S. Cl. .................................... 251/30.05; 251/29; 244/134 A
[58] Field of Search .......... 244/134 A; 251/29, 30.02, 251/30.05; 222/3, 195

[56] References Cited

U.S. PATENT DOCUMENTS 3,263,702  8/1966  Pullen et al. ..................... 244/134 R
3,706,911 11/1987  Briscoe et al. .................. 244/134 A
3,720,388  3/1973  Kaatz et al. ..................... 244/134 A
4,747,575  5/1988  Putt et al. ......................... 251/30.02

Primary Examiner—A. Michael Chambers
Attorney, Agent, or Firm—Dawing M. Ronyak

[57] ABSTRACT

A rapid acting valve capable of delivering a high pressure impulse of compressible fluid has a pilot section, an intermediate section and an output section which are pressurized to approximately equilibrium with the inlet pressure during the load portion of the operating cycle and which cooperate to provide extremely rapid full opening of the output section to release fluid uner pressure from an accumulator through an output section piston seat. The valve is particularly suitable for use in combination with pneumatic impulse separation systems such as those employed for deicing aircraft surfaces.

22 Claims, 2 Drawing Sheets

PNEUMATIC IMPULSE VALVE AND SEPARATION SYSTEM

Field of the Invention

This invention relates to a pneumatic impulse valve and a fluid impulse separation system including such a valve. More particularly, this invention pertains to an extremely rapid acting valve capable of delivering an impulse of compressible fluid and to a fluid impulse separation system suitable for deicing of aircraft leading edge surfaces.

BACKGROUND OF THE INVENTION

From the beginning of powered aviation, aircraft have been under certain flying conditions troubled by accumulations of ice on component surfaces of aircraft such as wings and struts. If unchecked, such accumulations can eventually so laden the aircraft with additional weight and so alter the airfoil configuration of the wings and control surfaces of that aircraft so as to precipitate an unflyable condition. Efforts to prevent and/or remove such accumulations of ice under flying conditions has resulted in three generally universal approaches to removal of accumulated ice, a process known generally as de-icing.

In one form of de-icing known as thermal de-icing, leading edges, are heated to loosen adhesive forces between accumulating ice and the aircraft component. "Leading edges" as used herein means those edges of an aircraft component on which ice accretes and are impinged upon by air flowing over the aircraft and having a point or line at which this airflow stagnates. Once loosened, this ice is generally blown from the aircraft component by the airstream passing over the aircraft. There are two popular methods of heating leading edges. In one approach known as electrothermal de-icing, an electrical heating element is placed in the leading edge zone of the aircraft component, either by inclusion in a elastomeric boot applied over the leading edge. or by incorporation into the skin structure of the aircraft component. This heating element is typically Powered by electrical energy derived from a generating source driven by one or more of the aircraft engines and is switched on and off to provide heat sufficient to loosen accumulating ice. In small aircraft, a sufficient quantity of electrical power may be unavailable for use of electrothermal de-icing.

In the other heating approach, gases at elevated temperature from one or more compression stages of a turbine engine are circulated through the leading edges of components such as wings and struts in order to affect a de-icing or anti-icing effect. This approach is employed typically only in aircraft powered by turbine engines by draining off compressed air having an elevated temperature from one or more compressor stations of a turbine engine. This approach can result in reduced fuel economy and lower turbine power output.

The second commonly employed method for de-icing involves chemicals. In limited situations, a chemical has been applied to all or part of an aircraft to depress adhesion forces associated with ice accumulation upon the aircraft or to depress the freezing point of water collecting upon surfaces of the aircraft.

The remaining commonly employed method for de-icing is typically termed mechanical de-icing. In the principal commercial mechanical de-icing means, pneumatic de-icing, the leading edge zone or wing or strut component of an aircraft is covered with a plurality of expandable, generally tube-like structures, inflatable employing a pressurized fluid, typically air. Upon inflation, the tubular structures tend to expand substantially the leading edge profile of the wing or strut and crack ice accumulating thereon for dispersal into the airstream passing over the aircraft component. Typically, these tube-like structures have been configured to extend substantially parallel to the leading edge of the aircraft. These conventional low pressure pneumatic de-icers are formed from compounds having rubbery or substantially elastic properties. Typically, the material forming the inflatable tubes on such de-icer structures can expand or stretch by 40% or more during an inflatable cycle, thereby causing a substantial change in the profile the de-icer as well as in the leading edge to thereby crack ice accumulating on the leading edge. These conventional pneumatic de-icers require a large volume of air to inflate their highly expandable tubes and the time for inflating such tubes typically and historically has averaged from about two and six seconds. The distortion of the airfoil profile caused by inflation of the tubes can substantially alter the airflow pattern over the airfoil and adversely affect the lift characteristics of the airfoil. The rubber or rubber-like materials forming these conventional pneumatic de-icers typically are possessed of a Young's modulus (modulus of elasticity) of approximately 6900 Kpa. The modulus of elasticity of ice is variously reported as being between about 275,000 Kpa and about 3,450,000 Kpa. Ice is known to be possessed of an elastic modulus enabling typical ice accumulations to adjust to minor changes in contours of surfaces supporting such ice accumulations. While the modulus of elasticity of rubber compounds used in conventional de-icers is much lower than the modulus of elasticity typically associated with ice accumulations. The large expansion of conventional pneumatic de-icers has functioned to crack or rupture the structure of the ice accumulations thereby allowing such accumulations to be swept away by impinging windstreams.

Other mechanical means for effecting ice de-icing include electromechanical hammering such as that described in U.S. Pat. No. 3,549,964 to Levin et al. Concern respecting the susceptibility of the airfoil skin to stress fatigue upon being hammered over extended periods of time have functioned in part to preclude substantial commercial development or adoption of such technique.

Another electromechanical ice removal system is described in U.S. Pat. No. 4,690,353 to Haslim et al. One or more overlapped flexible ribbon conductors, each of which is folded back on itself, is embedded in an elastomeric material. When a large current Pulse is fed to the conductor, the anti-parallel currents in the opposed segments of adjacent layers of the conductor result in interacting magnetic fields producing an electrorepulsive force between the overlapping conductor segments causing them to be separated near instantaneously. This distention tends to remove any solid body on the surface of the elastomeric material.

U.S. Pat. Nos. 4,706,911 to Briscoe et al and 4,747,575 to Putt et al disclose apparatus for de-icing leading edges in which an impulse of fluid under pressure is utilized to rapidly inflate an inflation tube positioned between a support surface and a sheet-like skin possessed of a substantially elevated modulus. The impulse of fluid is delivered to the inflation tube causing the high modulus skin to dislocate and then stop suddenly. Momentum imparted to the ice accumulations thereby causes additional ice movement which assists in ice detachment and dislodgement. The inflatable tubular structure in certain preferred embodiments is inflated within not more than about 0.1 second and preferably not more than about 0.5 milliseconds. FIG. 4 and the attendant description of U.S. Pat. No. 4,706,911 describe an ejector/pilot operated impulse de-icers. In FIG. 7 and the attendant description of U.S. Pat. No. 4,747,575 there is described a chattering valve for use in a pneumatic impulse de-icer which delivers a rapid series of fluid pressure pulses to the inflatable tube of a de-icer apparatus affixed to a leading edge. Efforts to improve such pneumatic impulse d-icing systems have led to continuing efforts to improve valves for delivery of the desired fluid impulse.

SUMMARY OF THE INVENTION

According to an aspect of the present invention, there is provided a valve comprising pilot, intermediate and output sections, the pilot section including a pilot housing containing a pilot cavity, inlet conduit means extending from the exterior of the pilot housing to the pilot cavity, exhaust conduit means extending from the pilot cavity to the exterior of the pilot housing, and intermediate conduit means extending from the pilot cavity to said intermediate section, gate means configured for movement from a load position during which the inlet conduit means is in fluid communication with said intermediate conduit means and a dump position during which the exhaust conduit means is in fluid communication with said intermediate conduit means while said inlet conduit means is disconnected from said intermediate conduit means;

the intermediate section including an intermediate housing containing an intermediate cavity having an inlet port in fluid communication with said intermediate conduit means, an exhaust vent, and an outlet port in fluid communication with output conduit means, the outlet port being proximate to the exhaust vent, and a poppet contained within said intermediate cavity configured for movement from a load position during which fluid under pressure may enter the intermediate cavity and force the poppet to seal off movement of fluid into the exhaust vent while permitting flow of fluid to the outlet port and a dump position during which fluid under pressure may flow from said output conduit means to said vent;

the output section including an output housing containing an output cavity having an inlet orifice in fluid communication with said output conduit means, an outlet and accumulation means having an opening to said output cavity proximate to said outlet, and a piston contained within said output cavity configured for movement from a load position during which fluid under pressure may enter the output cavity through said inlet orifice and force the piston to seal off movement of fluid into the outlet while permitting flow of fluid into the accumulation means, and a dump position during which fluid under pressure may flow from said accumulation means to said outlet.

In preferred embodiments, the poppet and associated intermediate cavity are of cylindrical shape and the end of the poppet facing the exhaust vent includes a frustoconical face capable of sealing against flow from the intermediate cavity when engaged with the poppet seat. In like manner, the Piston and associated output cavity are of cylindrical shape and the end of the piston facing the outlet includes a frustoconical face capable of sealing against fluid flow from the output cavity when engaged with the poppet seat. The inclusion of these frustoconical sealing faces serve to accelerate the opening of the valve because as pressure is released from the intermediate and output cavities and the poppet and piston respectively begin to move away from their corresponding annular seats, a greater area is presented to the escaping fluid causing an even greater force to be exerted on the poppet and piston moving them even more rapidly away from their seated positions.

In Preferred embodiments, the housing is unitary and is formed of metal, and the poppet and piston are formed of plastic material.

According to a further aspect of the present invention, there is provided in combination a valve as aforedescribed and a fluid impulse separation apparatus which includes an outer surface layer formed of a material having a Young's modulus of at least 40,000 Kpa and at least one inflatable tubular member beneath the outer surface layer positioned such that fluid impulse inflation of the tubular member causes reaction movement of the outer surface layer to effect separation and dislodgement of any material lying thereon such as ice.

The above and other features and advantages of the invention will become more apparent when considered in light of the following description of a preferred embodiment of the invention, in conjunction with the accompanying drawings which also form a part of the specification.

DETAILED DESCRIPTION OF PREFERRED EMBODIMENTS

Figure 1:
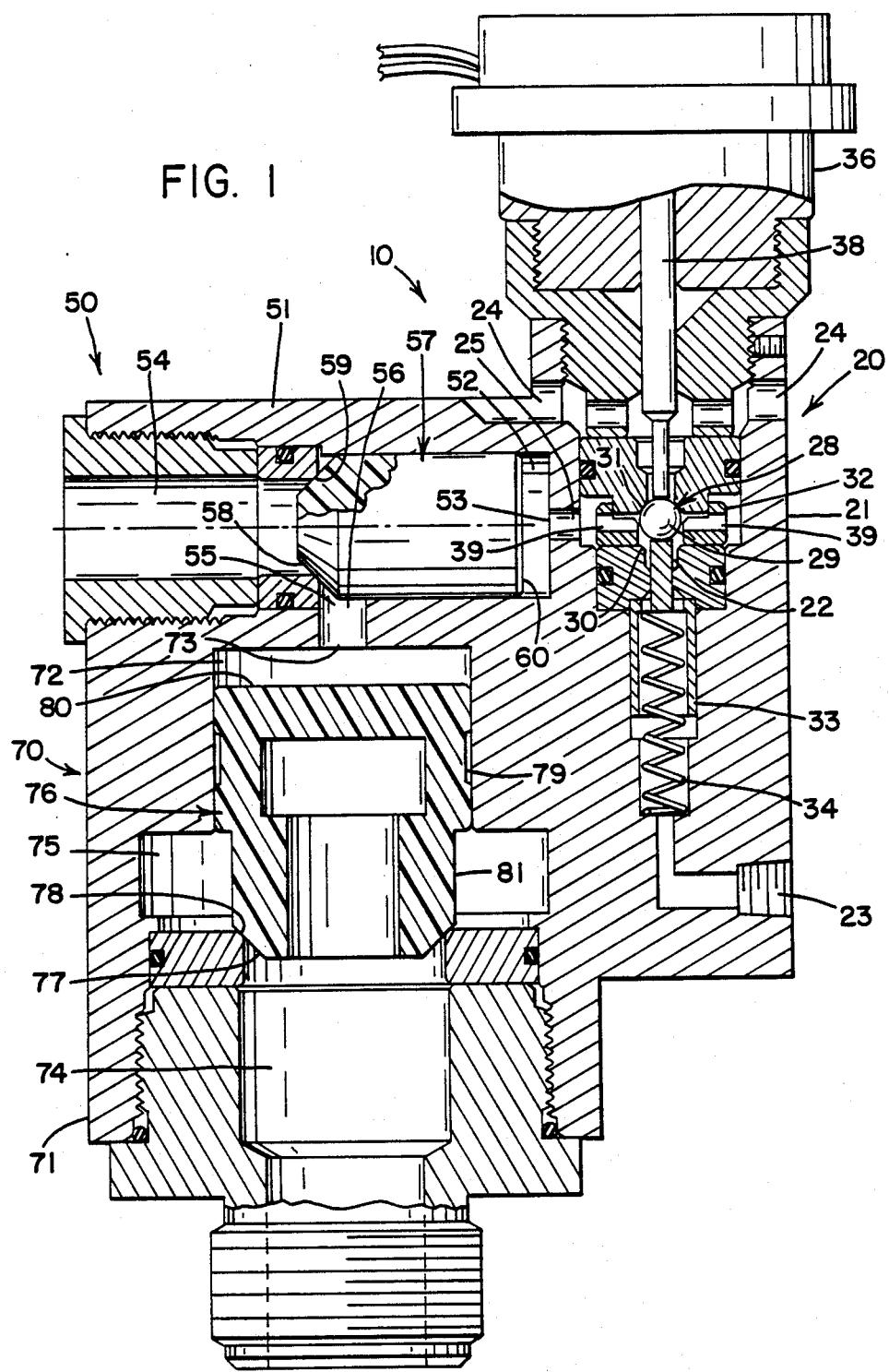
FIG. 1 is a side elevational view in partial cross section of a valve according to the present invention.

Referring to FIG. 1, a valve 10 including a pilot section 20, an intermediate section 50 and an output section 70 is depicted. The pilot section 20 includes a pilot housing 21 which contains a pilot cavity 22. Inlet conduit means 23 extends from the exterior of the pilot housing 21 to the pilot cavity. Exhaust conduit means 24 extends from pilot cavity 22 to the exterior of the pilot housing. Intermediate conduit means 25 extends from the pilot cavity 22 and terminates in inlet port 53 of the intermediate cavity 52. Pilot section 20 also includes gate means 28 which are configured for movement from a load position as shown in FIG. 1 during which the inlet conduit means 23 is in fluid communication with said intermediate conduit means 25 and a dump position (not shown) during which the exhaust conduit means 24 is in fluid communication with said intermediate conduit means 25. When gate means 28 is in dump position, the inlet conduit means 23 is sealed off and disconnected from intermediate conduit means 25. In the Preferred embodiment shown gate means 28 includes a ball 29 of stainless steel which is urged upwardly into load position by plunger 33 and spring 34 into contact with the annular seat 31 of exhaust conduit means 24 during the load portion of the valve operating cycle.

A conventional electrical solenoid 36 is affixed to the Pilot section 20 of valve 10, such that core rod 38, when the solenoid is not energized, has its end positioned just above ball 29. Upon energization of the solenoid 36 core rod 38 is driven downwardly and forces ball 29 downwardly off exhaust conduit seat 31 and onto inlet conduit seat 30. Spacer 32 serves to constrain the movement of the ball in line between seats 30 and 31. Spacer 32 includes a plurality of radially extending passages 39 to facilitate passage of fluid between the pilot cavity 22 and intermediate conduit means 25. Spacer 32 and the upward end of plunger 33 are configured to enable fluid flow from inlet conduit means 23 into pilot cavity 22 through inlet conduit seat 30.

Intermediate section 50 includes an intermediate housing 51 which may be integral as shown with the housing of pilot section 20 and output section 70. The intermediate section 50 includes an intermediate cavity 52 which has an inlet port 53 that is in fluid communication with the intermediate conduit means 25. At the opposite end of the intermediate cavity is annular poppet seat 59 which opens into exhaust vent 54. Proximate to exhaust vent 54 is an outlet Port 55 which extends at substantially a right angle to the common axial center line of the cylindrical intermediate cavity and exhaust vent. A cylindrical poppet 57 is reciprocally contained within intermediate cavity 52. Poppet 57 is configured for movement from a load position as shown in FIG. 1 to a dump position (not shown) during which poppet is shifted to a position away from poppet seat 59, that is toward the right with respect to the view shown in FIG. 1. Poppet 57 includes a frustoconical end face 58 capable of sealing against movement of fluid into exhaust vent 54 when in contact with annular poppet seat 59. Poppet is shown in FIG. 1 in its load position during which fluid under pressure may enter intermediate cavity 52 by coursing through inlet conduit means 23, pilot cavity 22, and intermediate conduit means 25. Poppet 57 has an outside diameter very slightly less than the inside diameter of cylindrical intermediate cavity 52. No sealing rings are provided on poppet 57. This close fitting of poppet 57 to intermediate cavity 52 provides sealing against fluid flow under dynamic conditions existent during the opening or dump portion of the valve operating cycle while under static conditions existent during the load portion of the valve operating cycle fluid may flow through the restrictive annular clearance between poppet 57 and the interior walls of intermediate cavity 52 into outlet Port 55 and output conduit means 56.

Output section 70 includes an output housing 71 which may be common with that of intermediate section 50 and pilot section 20 as shown. The output section includes an output cavity 72 having an inlet orifice 73 in fluid communication with output conduit means 56, and an outlet 74 at the opposite end of output cavity 72. An accumulation chamber 75 of predetermined volume proximate to outlet 74 is open to the output cavity 72. The end of the cylindrical output cavity 72 adjacent the outlet 74 includes an annular piston seat 78. Cylindrical piston 76 includes a frustoconical end face 77 capable of sealing against flow of fluid under pressure from accumulation chamber 75 and output cavity 72 when end face 77 is in contact with piston seat 78. Piston 76 has an outside diameter very slightly less than the inside diameter of output cavity 72. No sealing rings are Provided on piston 76. This close fitting of piston 76 to output cavity 72 Provides sealing under dynamic conditions existent during the opening or dump portion of the valve operating cycle while under static conditions existent during the load portion of the valve operating cycle permits flow of fluid under pressure through the annular clearance opening between Piston 76 and the cylindrical output cavity wall into accumulation chamber 75. Piston 76 is contained within output cavity 72 and configured for movement from a load position as shown in FIG. 1 to a dump position (not shown) during which the piston is displaced away from piston seat 78 and toward the inlet orifice 73. When in load position, fluid under pressure may enter the output cavity 72 through inlet orifice 73 and fill accumulation chamber 75 by Passing through the annular clearance between piston 76 and the cylindrical wall of output cavity 72. When in dump position, fluid under pressure in accumulation chamber 75 is free to exit through the annular opening between the frustoconical end face 77 of piston 76 and piston seat 78 into outlet 74.

The valve body or housing is preferably integral as shown although separate housings may be provided for each of pilot, intermediate and output sections. The housing may be formed of aluminum or steel or other material that is structurally capable of holding the intended pressure. For use in combination with aircraft de-icing apparatus, a preferred material for the housing is aluminum. While anodization is not required to achieve effective functioning and an operational life of more than a million cycles, anodization is preferred to further increase life of the housing against wear and to inhibit corrosion.

The poppet 57 of the intermediate section 50 and the piston 76 of the output section 70 are Preferably formed as hollow cylindrical bodies to reduce their mass to a minimum to enable fastest possible response to initiation of the dump portion of the valve operating cycle. The poppet and piston are preferably formed of an engineering plastic material. A highly suitable combination is a poppet and a piston formed of PEEK (poly ether ether ketone) in an aluminum housing because this combination exhibits excellent resistance to corrosion, a low coefficient of sliding friction and a good match in coefficient of thermal expansion over the temperature range for which aircraft equipment need be operational. When this combination of materials is utilized, the clearance at room temperature of the poppet and piston to their respective bores is Preferably of the order of about 0.0005 inch diameter. A greater clearance will result in a slower acting valve and a lower output pressure pulse. Maximum clearance is believed to be about 0.005 inch diameter but this has not been experimentally verified. The poppet and piston may be provided with a circumferential relief such as relief 79 shown on piston 76 to reduce machining costs associated with the close tolerances required and friction when in operation. Such relief also serves to further reduce the mass of the poppet and piston thereby increasing the rate of response when the dump portion of the valve operating cycle is initiated.

Respecting the pilot section 20, plunger spring 34 is preferably formed of 300 series stainless steel or plated high carbon music wire to inhibit corrosion. Ball 29 is preferably formed of stainless steel, Preferably type 440 C. Solenoid 36 may be a standard push type 28 volt DC solenoid, the only requirements being that it be dimensioned to fit to the pilot section and have an adequate motion when energized to move the ball off the seat 31 of exhaust conduit 24 and into sealing engagement with seat 30 of inlet conduit 23.

While the poppet 57 and piston 76 are shown to include a frustoconical face configured for sealing engagement with their corresponding seat, a different configuration could be employed such as an annular shoulder or step-down region (not illustrated) and a corresponding sealing surface on the seat. An O-ring could be affixed to the poppet or piston or its corresponding seat to provide the requisite seal when engaged. These alternates are not as preferred as that illustrated and described in detail because they lack the positive aerodynamic spring rate which is Provided by the frustoconical sealing faces of the poppet and piston.

While the invention has been described in regard to a valve having three sections, four or more sections could be employed to achieve even faster dump response time of the final output section, dump response time being defined as the time required for the output section piston to go from full-closed to full-open position. In the embodiment illustrated, dump response times of less than 0.01 second are easily obtained and time required for the piston to go from full-closed to full-open position of 0.001 second and less have been achieved, for example about about 0.0005 second with a $C_v$ of about 5.

Dump cycle time, defined as the time elapsed between movement of gate means 28 from its load position to its dump position, e.g. by energization of solenoid 36, and initiation of release of a pulse of pressurized fluid from the accumulator means 75 into outlet 74, is also extremely rapid. For embodiments like that illustrated in FIG. 1, dump cycle times of less than 0.01 second are easily obtained and dump cycle times of less than 0.005 second have been achieved. In the embodiment illustrated, counting elapsed time beginning with the instant that solenoid 36 is energized, less than 0.004 seconds elapse until a pulse of the pressurized fluid from the accumulator means 75 is initiated.

In use valve 10 while in its load position as illustrated in FIG. 1 becomes pressurized throughout inlet conduit means 23, pilot cavity 22, intermediate conduit means 25, inlet port 53, intermediate cavity 52, outlet port 55, output conduit means 56, inlet orifice 73, output cavity 72, and accumulation chamber 75. Fluid under pressure is able to flow into output cavity 72 and accumulation chamber 75 because a clearance is provided between poppet 57 and the cylindrical wall of intermediate cavity 52 and between the cylindrical surface of piston 76 and the cylindrical wall of output cavity 72. Typically, this pressure is at least 500 psig and may be as high as 5,000 psig or more as desired for the intended application. Ball 29 is in sealing contact with annular seat 31 of exhaust conduit 24 thereby preventing loss of pressure from inlet conduit 23 or intermediate conduit means 25.

The dump portion of the operational cycle begins with energization of solenoid 36. Energization of solenoid 36 forces core rod 38 downwardly against ball 29, driving ball 29 away from exhaust conduit seat 31 downward and into sealing engagement with seat 30 of inlet conduit 23. This opens pilot cavity 22 to exhaust conduit means 24 and seals off inlet conduit means 23 from pilot cavity 22. The fluid pressure in the intermediate cavity 52 begins to reduce by exhaustion through intermediate conduct means 25, pilot cavity 22 and exhaust conduit means 24. As the pressure acting on the end of the poppet 57 nearest the intermediate conduit means 25 diminishes and thereby leaves fluid pressure in the output conduit means 56 and output cavity 72 much more elevated than the fluid pressure acting on the flat end 60 of poppet 57, this pressure differential causes the frustoconical end face 58 of poppet 57 to unseat poppet 57 from the poppet seat 59 and thereby discharges pressurized fluid from the output cavity 72 between the flat end face 80 of piston 76 through exhaust vent 54. Reduced pressure upon the flat end face 80 of piston 76 leaves the fluid pressure in accumulation chamber 75 much more elevated and this pressure differential acts upon the frustoconical end face 77 and reduced diameter region 81 of piston 76 to lift the piston from piston seat 78 thereby enabling the fluid Pressure in accumulator chamber 75 to be discharged into outlet 74.

As the poppet 57 and piston 76 begin to lift from their respective seats 59 and 78, a greater area of their respective frustoconical end faces 58 and 77 is subjected to the fluid pressure differential. This configuration results in what has been referred to as a positive aerodynamic spring rate which causes increasingly rapid acceleration of the poppet 57 and Piston 76 as they move away from their respective seats 59, 78 to full-open position at the opposite end of their respective cylindrical cavities 52, 72. Because the annular clearance between the poppet and the cylindrical wall of its intermediate cavity and the piston and the cylindrical wall of the output cavity are very small, little fluid pressure drop occurs due to reverse flow under these dynamic conditions.

After dumping and return of pilot section 20 gate means 28 to its load position as shown in FIG. 1, fluid pressure in accumulation chamber 75 is restored to about equal to that at inlet conduit means 23 in a short time, typically less than one second for the embodiment illustrated with an inlet Pressure of 1500 psig and a chamber 75 volume of about one cubic inch.

Although the invention has been described with reference to certain preferred embodiments, it would be apparent to persons skilled in the art that other variations in the valve of the invention are obvious and these are intended to be included by the present specification and claims. The device could be formed with a different orientation of the sections. For example, the output section could be turned 180° to be beside the solenoid or at 90° to extend into or out of the page of FIG. 1. The accumulator chamber could be larger or smaller, it could have a different shape, or it could be connected to an external chamber or conduit. A manual actuator, pneumatic actuator or a hydraulic actuator or a camming device could be employed rather than a solenoid. The poppet and piston need not be hollow nor need they have conical sealing faces as shown and described. O-rings or other sealing rings could be employed on the poppet and piston and restricted passages could be provided to enable pressurization of the intermediate and output sections such as, for example, a small passageway extending through the piston body from the upstream portion of the intermediate cavity to the upstream portion of the output cavity.

Figure 2:
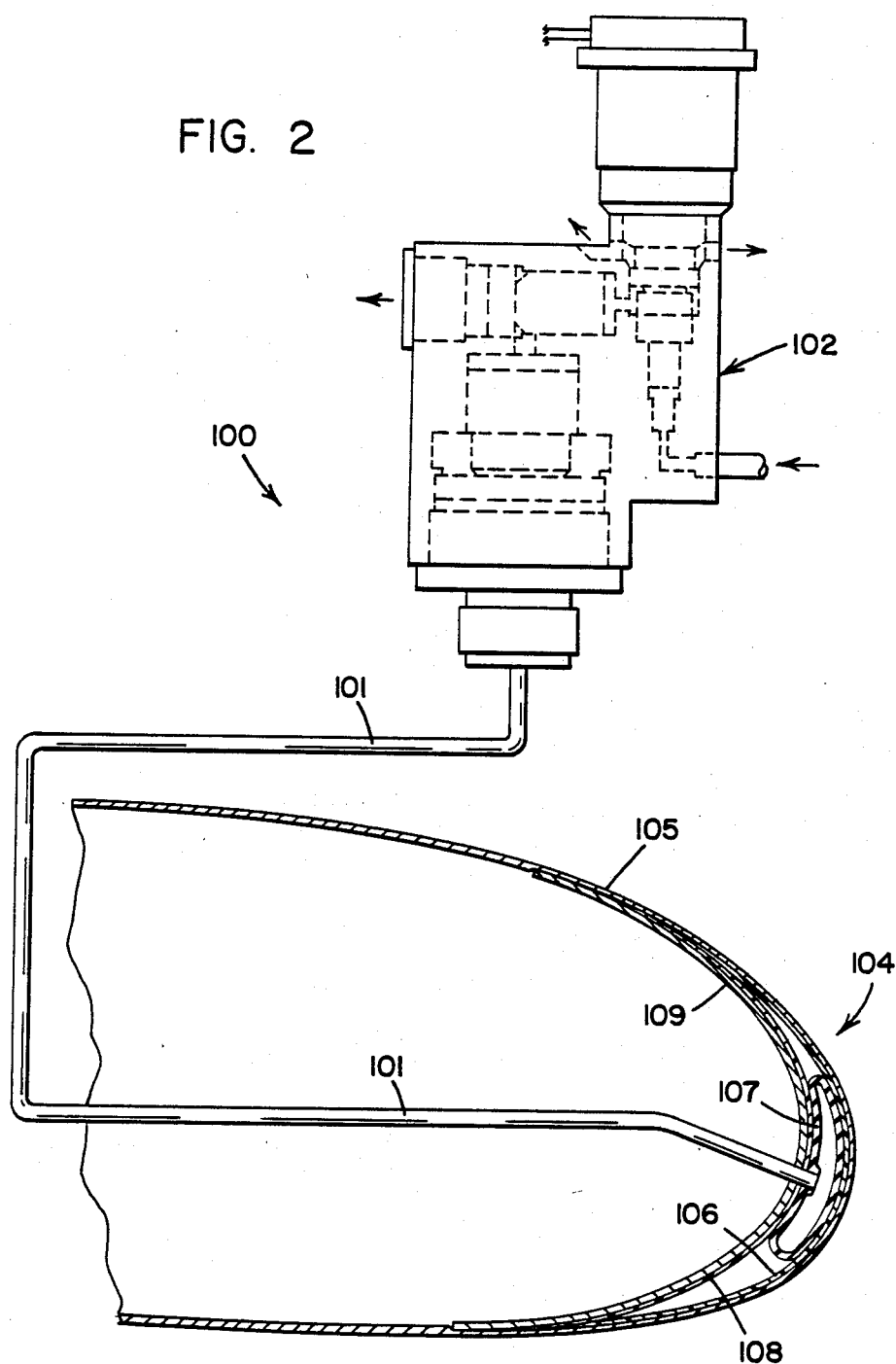
FIG. 2 is a combined schematic and sectional view of a valve and fluid impulse separation apparatus according to the present invention.

Referring now to FIG. 2, there is shown a fluid impulse separation system 100 generally. The fluid impulse separation system 100 comprises a fluid impulse valve 102 joined by impulse conduit means 101 to a fluid impulse separation apparatus 104 which in the embodiment illustrated is an airfoil such as a wing of an aircraft. Fluid impulse separation apparatus 104 comprises an outer surface layer or skin 105 having the shape of an airfoil, an elastomeric layer 106 bonded to the obverse of skin 105, and fabric reinforced inflatable tube 107 and an elastomeric base layer 108. Base layer 108 is utilized for bonding the illustrated structure just described to a rigid backing such as the underlying support structure 109 of the airfoil. Further detailed description of suitable fluid impulse separation apparatuses is contained in U.S. Pat. Nos. 4,747,575 and 4,706,911, the teachings of which are herein incorporated by reference.

What is claimed is:

1. A valve comprising pilot, intermediate and output sections, the pilot section including a pilot housing containing a pilot cavity, inlet conduit means extending from the exterior of the pilot housing to the pilot cavity, exhaust conduit means extending from the pilot cavity to the exterior of the pilot housing, and intermediate conduit means extending from the pilot cavity to said intermediate section, gate means configured for movement from a load position during which the inlet conduit means is in fluid communication with said intermediate conduit means and a dump position during which the exhaust conduit means is in fluid communication with said intermediate conduit means while said inlet conduit means is disconnected from said intermediate conduit means;

the intermediate section including an intermediate housing containing an intermediate cavity having an inlet port in fluid communication with said intermediate conduit means, an exhaust vent, and an outlet port in fluid communication with output conduit means, the outlet port being proximate to the exhaust vent, and a poppet contained within said intermediate cavity configured for movement from a load position during which fluid under pressure may enter the intermediate cavity and force the poppet to seal off movement of fluid into the exhaust vent while permitting flow of fluid to the outlet port and a dump position during which fluid under pressure may flow from said output conduit means to said vent; the output section including an output housing containing an output cavity having an inlet orifice in fluid communication with said output conduit means, an outlet and accumulation means having an opening to said output cavity proximate to said outlet, and a Piston contained within said output cavity configured for movement from a load position during which fluid under pressure may enter the output cavity through said inlet orifice and force the piston to seal off movement of fluid into the outlet while permitting flow of fluid into the accumulation means, and a dump position during which fluid under pressure may flow from said accumulation means to said outlet.

2. The valve of claim 1 further including solenoid operably connected to the pilot section for movement of said gate means between its load and dump positions.

3. The valve of claim 1 wherein said pilot section includes a pilot cavity, said inlet conduit means, said exhaust conduit means and said intermediate conduit means each being operably connected to said pilot cavity, said pilot cavity containing said gate means comprising a ball movable from a load position during which the ball permits movement of fluid from said inlet conduit means into said intermediate conduit means and a dump position during which the ball prevents movement of fluid from said inlet conduit means into said intermediate conduit means while permitting movement of fluid from said intermediate conduit means to said exhaust conduit means.

4. The valve of claim 3 further including a solenoid operably connected to said pilot section, the solenoid core rod moving the ball from its load position to its dump position when energized.

5. The valve of claim 4 wherein the poppet and intermediate cavity are of cylindrical shape and the poppet outside diameter is closely fitted to the inside diameter of the intermediate cavity, one end of the intermediate cavity containing said inlet port, the opposite end of said intermediate cavity containing a circular poppet seat opening into said exhaust vent, the end of the poppet facing the poppet seat including a frustoconical face capable of sealing against fluid flow when engaged with said poppet seat, the piston and output cavity, one end of the output cavity containing the inlet orifice, the opposite cavity containing a circular piston seat opening into said outlet, the end of the piston facing the piston seat including a frustoconical face capable of sealing fluid flow when engaged with said piston seat.

6. The valve of claim 5 wherein the pilot, intermediate and output sections are contained in a single housing.

7. The valve of claim 5 in which the housing of the pilot, intermediate and output sections is formed of metal and the poppet and piston are formed of plastic matrix.

8. In combination, a valve according to claim 5 and fluid impulse separation apparatus comprising an outer surface layer having a Young's modulus of at least 275,000 kPa and at least one inflatable tubular member positioned beneath the outer surface layer such that fluid impulse inflation of said tubular member causes reaction movement of said outer surface layer.

9. The valve of claim 1 wherein the accumulation means is a chamber within the output housing.

10. The valve of claim 1 wherein the poppet and intermediate cavity are of cylindrical shape, the poppet outside diameter being very slightly less than the inside diameter of the intermediate cavity, one end of the intermediate cavity containing said inlet port, the opposite end of the intermediate cavity containing a poppet seat opening into said exhaust vent, the end of the poppet facing the poppet seat including a frustoconical face capable of sealing fluid flow when engaged with said poppet seat.

11. The valve of claim 1 wherein the piston and output cavity are of cylindrical shape, the piston outside diameter being very slightly less than the inside diameter of the output cavity, one end of the output cavity containing the inlet orifice, the opposite cavity containing a circular piston seat opening into said outlet, the end of the piston facing the piston seat including a frustoconical face capable of sealing fluid flow when engaged with said piston seat.

12. The valve of claim 1 wherein the pilot, intermediate and output sections are contained in a single housing.

13. In combination, the valve of claim 1 and a source of compressible fluid at a pressure substantially above atmospheric pressure.

14. The valve of claim 1, which when its inlet is connected to a source of a compressible fluid at a pressure elevated substantially above atmospheric pressure, has a dump cycle time of not more than 0.01 seconds.

15. The valve of claim 1 having an output section load position to dump position response time not exceeding 0.001 second.

16. A method for providing a pulse of compressible fluid comprising:

providing a valve according to claim 1 with pilot section gate means in its load position; coupling the inlet of said valve to a source of compressible fluid at a pressure elevated substantially above atmospheric, said fluid coursing through said inlet conduit means, said intermediate conduit means, around said poppet, through said output conduit means, and around said piston into said accumulation means until the fluid pressure in said accumulation means is about equal to that at the inlet;

moving said pilot section gate means to its dump position, thereby initiating the following in rapid sequence: depletion of fluid pressure in the intermediate conduit means and that portion of the intermediate cavity between said poppet and said inlet port through said exhaust conduit means, movement of the poppet toward said inlet port, depletion of fluid pressure in said output conduit means and that portion of said output cavity between said piston and said inlet orifice through said exhaust vent, movement of said piston toward said inlet orifice, thereby dumping fluid under pressure in the accumulation means to said outlet.

17. The method of claim 16 in which a pulse of compressible fluid is provided at the outlet within 0.01 second after moving said pilot stage gate means to its dump position.

18. The method of claim 17 wherein fluid pressure in said accumulation means is restored to about equal to that at the inlet in about one second after returning said pilot section gate means to its load position.

19. The method of claim 16 wherein fluid pressure in said output conduit means and that portion of the output cavity between said piston and said inlet orifice accelerates movement of said poppet from its load to its dump position.

20. The method of claim 16 wherein fluid pressure in said accumulation means accelerates movement of said piston from its load to its dump position.

21. The method of claim 16 wherein said piston moves from its load to its dump position within 0.001 second.

22. In combination, a valve according to claim 1 and fluid impulse separation apparatus comprising an outer surface layer formed of a material having a Young's modulus of at least 40,000 kPa and at least one inflatable tubular member beneath the outer surface layer positioned such that fluid impulse inflation of said tubular member causes reaction movement of said outer surface layer.

* * * * *